United States Patent
Jones et al.

(10) Patent No.: US 10,769,432 B2
(45) Date of Patent: Sep. 8, 2020

(54) AUTOMATED PARAMETERIZATION IMAGE PATTERN RECOGNITION METHOD

(71) Applicant: DRVision Technologies LLC, Bellevue, WA (US)

(72) Inventors: Michael William Jones, Kenmore, WA (US); Luciano Andre Guerreiro Lucas, Redmond, WA (US); Hoyin Lai, Seattle, WA (US); Casey James McBride, Kirkland, WA (US); Shih-Jong James Lee, Bellevue, WA (US)

(73) Assignee: DRVISION TECHNOLOGIES LLC, Bellevue, WA (US)

( * ) Notice: Subject to any disclaimer, the term of this patent is extended or adjusted under 35 U.S.C. 154(b) by 148 days.

(21) Appl. No.: 16/156,814

(22) Filed: Oct. 10, 2018

(65) Prior Publication Data
US 2020/0117894 A1    Apr. 16, 2020

(51) Int. Cl.
| | |
|---|---|
| G06K 9/62 | (2006.01) |
| G06K 9/00 | (2006.01) |
| G06T 7/155 | (2017.01) |
| G06T 7/187 | (2017.01) |
| G06T 7/11 | (2017.01) |
| G06N 20/00 | (2019.01) |

(52) U.S. Cl.
CPC ..... *G06K 9/00536* (2013.01); *G06K 9/00523* (2013.01); *G06N 20/00* (2019.01); *G06T 7/11* (2017.01); *G06T 7/155* (2017.01); *G06T 7/187* (2017.01)

(58) Field of Classification Search
CPC .......... G06K 9/00536; G06K 9/00523; G06N 20/00; G06T 7/11; G06T 7/187; G06T 7/155
See application file for complete search history.

(56) References Cited

U.S. PATENT DOCUMENTS

| | | |
|---|---|---|
| 7,031,948 B2 | 4/2006 | Lee |
| 7,203,360 B2 | 4/2007 | Lee et al. |
| | (Continued) | |

*Primary Examiner* — Dhaval V Patel
(74) *Attorney, Agent, or Firm* — Pai Patent & Trademark Law Firm; Chao-Chang David Pai

(57) ABSTRACT

A computerized automated parameterization image pattern detection and classification method performs (1) morphological metrics learning using labeled region data to generate morphological metrics; (2) intensity metrics learning using learning image and labeled region data to generate intensity metrics; and (3) population learning using the morphological metrics and the intensity metrics to generate learned pattern detection parameter. The method may further update the learned pattern detection parameter using additional labeled region data and learning image, and apply pattern detection with optional user parameter adjustment to image data to generate detected pattern. The method may alternatively perform pixel parameter learning and pixel classification to generate pixel class confidence, and uses the pixel class confidence and the labeled region data to perform pattern parameter learning to generate the learned pattern detection parameter. The method may further perform pattern classification learning to generate pattern classifier which is used to generate classified pattern.

19 Claims, 5 Drawing Sheets

(56) References Cited

U.S. PATENT DOCUMENTS

| | | | |
|---|---|---|---|
| 7,293,000 B2 | 11/2007 | Lee | |
| 7,974,464 B2 * | 7/2011 | Lee | G06K 9/38 |
| | | | 382/155 |
| 8,014,590 B2 | 9/2011 | Lee et al. | |
| 9,152,884 B2 * | 10/2015 | Lee | G06K 9/6256 |
| 2011/0176710 A1 * | 7/2011 | Mattiuzzi | G06F 19/321 |
| | | | 382/128 |
| 2017/0243051 A1 * | 8/2017 | Chukka | G06K 9/6292 |
| 2019/0042826 A1 * | 2/2019 | Chang | G06T 7/11 |

* cited by examiner

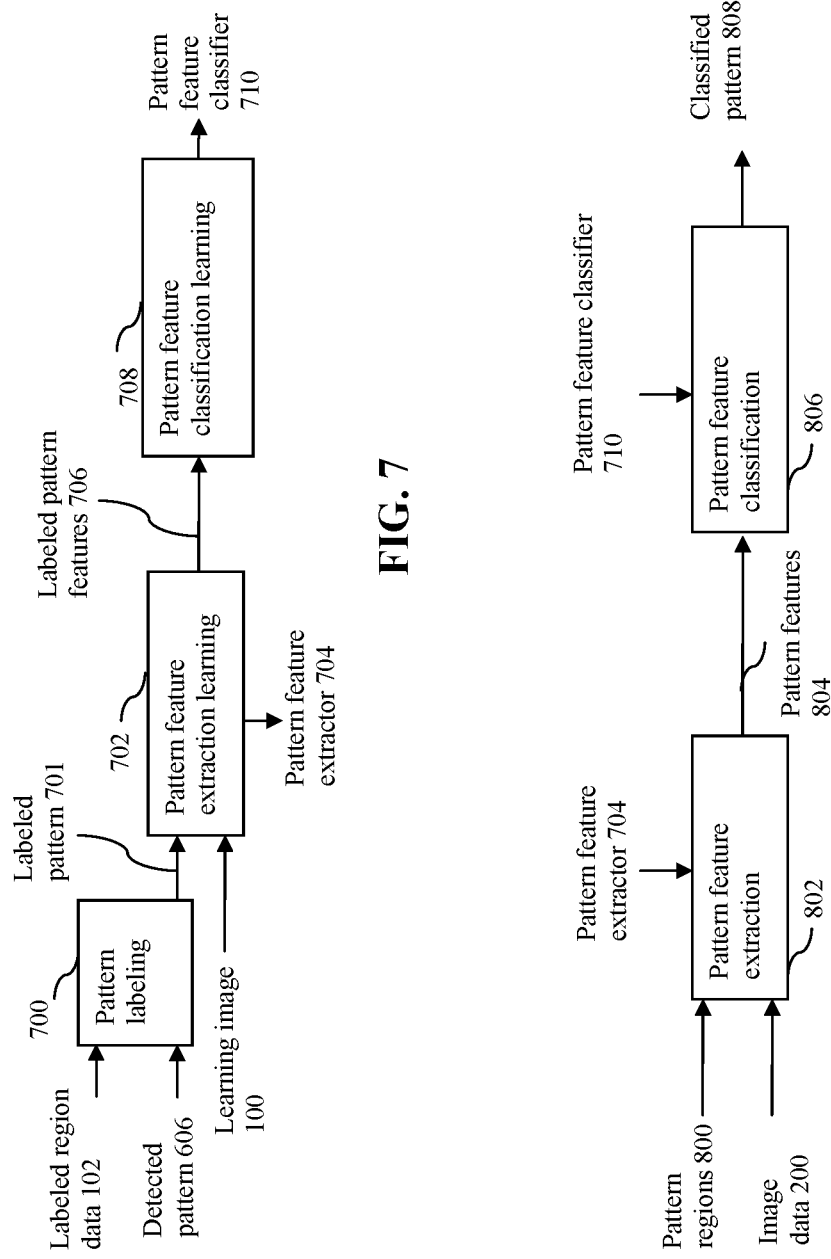

AUTOMATED PARAMETERIZATION IMAGE PATTERN RECOGNITION METHOD

STATEMENT AS TO RIGHTS TO INVENTIONS MADE UNDER FEDERALLY SPONSORED RESEARCH AND DEVELOPMENT

This work was supported by U.S. Government grant number 5R44NS097094-03, awarded by the NATIONAL INSTITUTE OF NEUROLOGICAL DISORDERS AND STROKE. The U.S. Government may have certain rights in the invention.

BACKGROUND OF THE INVENTION

Field of the Invention

The present invention relates to image pattern detection and classification. More particularly, the present invention relates to computerized automated parameterization methods for image pattern detection, segmentation and classification.

Description of the Related Art a. Description of Problem that Motivated Invention.

Significant advancements in imaging sensors, cameras, smart phones, microscopes, and digital imaging devices coupled with fast GPUs/CPUs, high speed network connections, large storage devices and cloud computing as well as AI/machine learning algorithms enable broad new applications in the field of image pattern recognition. The image recognition field includes a huge and broad range of practical activities including military and defense, life science, material sciences, drug discovery, medical diagnostics, health monitoring, precision medicine, computer-aided surgery, intelligent transportation systems, electronics manufacturing, robotics, entertainment and security systems. Image recognition applications entail the preprocessing and enhancement of images, definition of objects in images (image segmentation), calculation of object measurements, and the classification of object subsets and/or the creation of image based decision analytics such as automated defect inspection, disease diagnosis, and pharmaceutical assays in early drug discovery.

A typical image pattern recognition processing flow includes the segmentation of pattern regions from image background, the detection of patterns of interest and the classification of patterns into different classes. While it is relatively easy to generate large numbers of high quality image data, it is hard to efficiently recognize patterns of interest and extract knowledge from them. This is due to a critical limitation in state-of-the-art image pattern recognition tools. These tools use sets of manually engineered algorithms to generate segmentation, detection and classification results. They require a user to have a good understanding of image processing algorithms and master several user-facing parameters before one can efficiently use the tools. It is highly desirable to have an intuitive, easy-to-use workflow for obtaining image pattern recognition outcomes without image processing knowledge.

b. How Did Prior Art Solve Problem?

The encoding of processing rules and procedures into application workflow for high volume execution were facilitated by machine learning approaches in some steps of the pattern recognition processing flow. For example, the image segmentation algorithm could be created by teaching. See learnable object segmentation, U.S. Pat. No. 7,203,360, Apr. 10, 2007; method of directed pattern enhancement for flexible recognition, U.S. Pat. No. 7,974,464, Jul. 5, 2011 and U.S. Pat. No. 8,014,590, Sep. 6, 2011. The pattern classification rules could also be created by supervised machine learning. See regulation of hierarchic decisions in intelligent systems, U.S. Pat. No. 7,031,948, Apr. 18, 2006; information integration method for decision regulation in hierarchic decision systems, U.S. Pat. No. 7,293,000 Nov. 6, 2007; and teachable pattern scoring method U.S. Pat. No. 9,152,884, Oct. 6, 2015. However, users still need to define several parameters for pattern detection such as the morphological criteria to retain/reject patterns and criteria to partition (merge and/or split) patterns. Also, the segmentation teaching and the classification teaching are not integrated and optimized together.

BRIEF SUMMARY OF THE INVENTION

The primary objective of the invention is to provide a parameter-free image pattern recognition pipeline. The secondary objective of the invention is to provide an automated parameterization image pattern detection method. The third objective of the invention is to provide an automated parameterization image segmentation and pattern detection method. The fourth objective of the invention is to provide an automated parameterization image segmentation, pattern detection and classification method. The fifth objective of the invention is to allow the same learning images and labeled regions for the learning of image segmentation, pattern detection as well as pattern classification rules. The sixth objective of the invention is to allow the trained pattern recognition pipeline to be applied without any parameter settings to a large number of images. The seventh objective of the invention is to allow the incremental update of the pattern recognition pipeline by additional data and updated learning.

The current invention is a complete parameter-free (automated parameterization) image segmentation, pattern detection and classification pipeline, which requires minimal knowledge of image processing and pattern recognition. In this pipeline, image segmentation, pattern detection and classification parameters are automatically learned from the image data itself. A user only has to define the types of patterns he/she is interested in analyzing (e.g. cell cytoplasm and nuclei) by labeling a few regions representing the pattern types of interest. The tool then learns the intrinsic image segmentation parameters to assign pattern type confidences to each pixel, resulting in pattern class confidence maps. This is followed by learning the morphological and intensity parameters needed for pattern partitioning (i.e. merging or separating touching patterns) and non-pattern object rejection. The user's drawings are used to infer key descriptors such as size, shape, and separating distance between neighboring patterns. This information is used to set up internal parameters to partition objects in the confidence maps and thus detect patterns of defined types. This is then followed by feature measurements and machine learning enabled pattern classification. The same learning images and labeled regions are used for the learning of image segmentation, pattern detection as well as pattern classification rules with internal parameters. Except for the labeled regions and learning images, a user does not have to provide any parameters to create the image pattern segmentation, detection and classification pipeline. The trained pipeline can be applied without any parameter settings to a large number of images and the internal pipeline parameters can also be incrementally updated by additional learning.

BRIEF DESCRIPTION OF THE DRAWINGS

FIG. 7 shows the processing flow of the pattern classification learning method.

FIG. 8 shows the processing flow of the application method of the pattern classifier.

DETAILED DESCRIPTION OF THE PREFERRED EMBODIMENTS

The concepts and the preferred embodiments of the present invention will be described in detail below in conjunction with the accompanying drawings.

I. Automated Parameterization Image Pattern Detection

Figure 1:
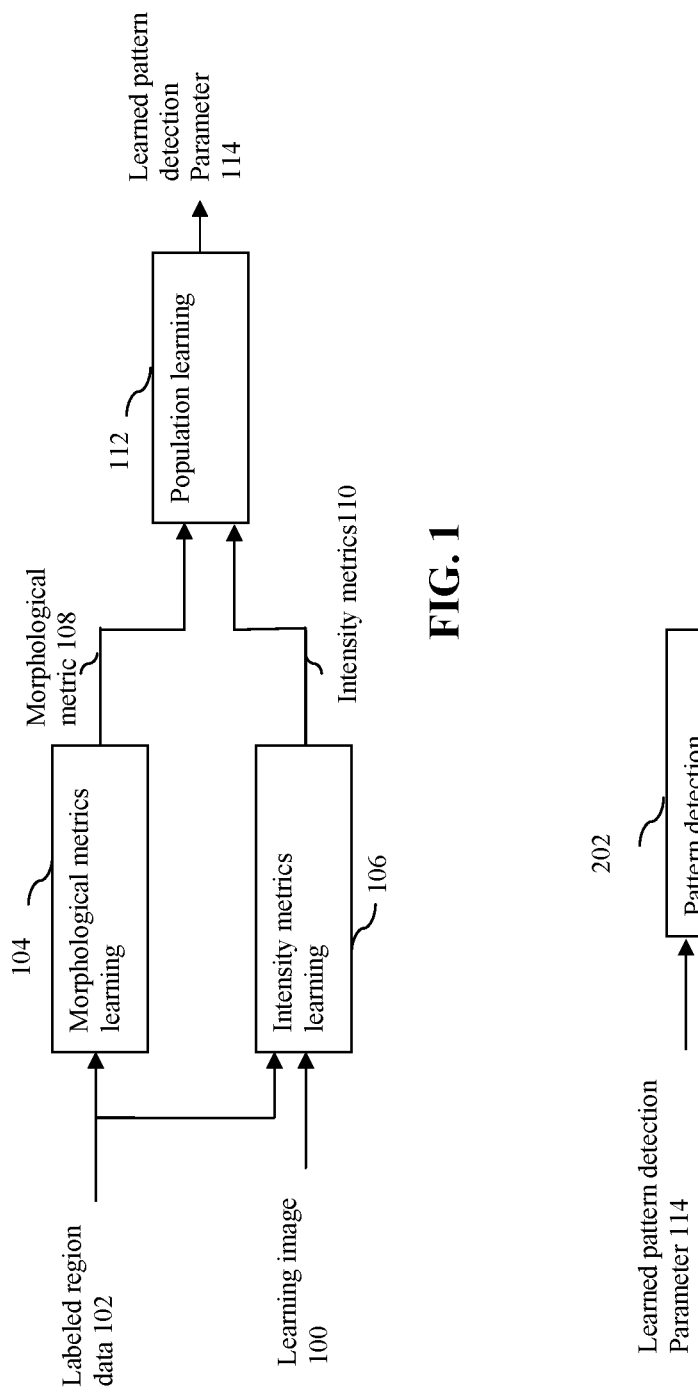
FIG. 1 shows the processing flow of the automated parameterization image pattern detection method according to the present application.

FIG. 1 shows the processing flow of the automated parameterization image pattern detection method of the current invention. The learning image 100 and the corresponding labeled region data 102 are entered into electronic storage means such as computer memories. The labeled region data 102 is processed by a morphological metrics learning 104 implemented in computing means to produce at least one morphological metric 108 including at least one of the size and shape estimates such as radius, area, volume, elongateness, compactness, eccentricity, etc. of the patterns represented by the labeled region data 102. The learning image 100 and the labeled region data 102 are processed by an intensity metrics learning 106 implemented in computing means to produce at least one intensity metric 110 including at least one of the average intensity, peak intensities and intensity distributions such as textural measurements. The at least one morphological metric 108 and at least one intensity metric 110 are processed by a population learning 112. The population learning 112 learns the distributions of the metrics among a plurality of image patterns of interest to generate the at least one learned pattern detection parameter 114. The learned pattern detection parameter 114 represents the automated parameterization output that provides the parameters necessary to perform the pattern detection task without manually setting the parameters that is time consuming, inconsistent and requires expert knowledge of pattern detection.

In one embodiment of the invention, the learning image 100 contains cellular structures imaged under a microscope. The labeled region data 102 contains manually or fluorescently labeled regions of interest specifying a variety of structures of interest and/or subcellular components of the learning image 100 that should be detected and regions in the learning image 100 that should be suppressed. The florescence label can be achieved by reporters such as gene probes or antibody labels that can effectively and objectively label the cellular structures of interest. The structures of interest are considered the foreground regions and the regions that should be suppressed are considered the background regions. In an alternative embodiment of the invention, subsets of the labeled regions are used as foreground regions and the detections are performed for each of the subsets separately.

The morphological metrics learning 104 and intensity metrics learning 106 first identify the isolated foreground regions through connected-components processing of the labeled region data 102 and consider each connected region as a representative object the user would like to detect. The morphological metrics learning 104 processes each object and measures different geometric quantities to generate at least one morphological metric 108 such as each object's radius, area, volume, elongateness, compactness, eccentricity, etc. The intensity metrics learning 106 processes the foreground objects similar to the morphological metrics learning 104. It measures intensity properties from the learning image 100, in the region associated with each object. In this embodiment, the intensity metrics learning 106 measures properties from the foreground objects such as the mean and medium intensities of each object, intensity max/min and quintile values (5%, 10%, 25%, 75%, 90%, 95%, etc.), the average number of bright intensity peaks that are present on each object as well as intensity distributions of each object such as textural measurements or intensity measurements after the learning image is pre-processed by different filters, high-pass, low-pass, band-pass, directional, etc. The intensity metrics learning 106 also measures the intensity distributions for the foreground and background regions of the entire learning image 100.

The population learning 112 processes the at least one morphological metric 108 and at least one intensity metric 110 of individual objects to learn how the metrics behave as a population across all objects. In one example embodiment, the distribution of the volume of the foreground objects is learned. The population learning 112 analyzes the population as a whole to learn suitable minimum and maximum volume limits to be included in the at least one learned pattern detection parameter 114. The minimum and maximum volume limits can be used to automatically reject detected objects having volumes that are higher or lower than the learned parameters. In another example embodiment of the invention, the user only draws 2D regions describing cross-sectional slices of the objects in a 3D volume image and the 2D radius of the slices is learned. From the 2D radius the volume is extrapolated assuming the object is spherical or an ellipsoid. The population learning 112 can also learn metrics differences between the foreground and background regions. In this embodiment, the at least one morphological metric 108 and the at least one intensity metric 110 of the entire foreground and background regions are learned. The population learning 112 analyzes both distributions to select a single threshold or bounds and limits that when applied for pattern detection can accurately separate the foreground and background regions.

Figure 2:
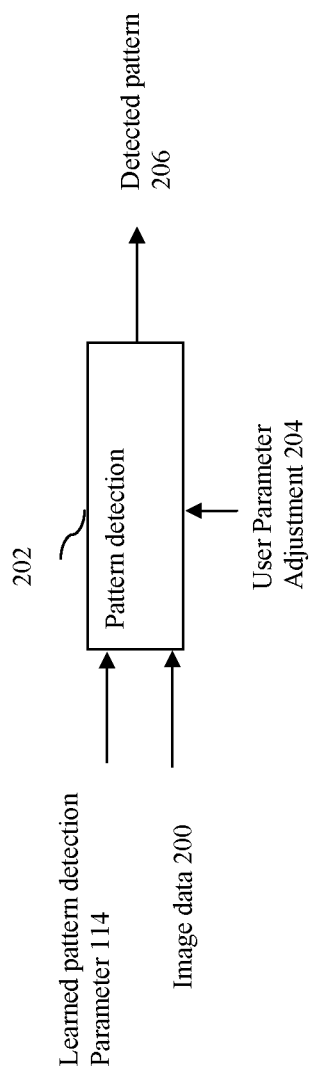
FIG. 2 shows the processing flow of the image pattern detection method.

FIG. 2 shows the application of automatic parameterization image pattern detection method of the current invention. The image data 200 is entered into electronic storage means such as computer memories and processed by a pattern detection method utilizing the learned pattern detection parameters 114 to generate detected pattern 206. The image data 200 can be the learning image 100 or new images.

The method can include optional user parameter adjustment 204 which modifies the learned pattern detection parameter 114 for the pattern detection 202. This is useful if there are mismatches or changes of imaging conditions between the learning image 100 and the image data 200. The learned pattern detection parameter 114 can be optionally updated by the parameter set from user parameter adjustment 204.

In one embodiment of the invention, the pattern detection 202 is a biological cell counting application that processes image data 200 containing cells acquired by a microscope. The pattern detection 202 method detects and counts the total number of cells within the image data 200. The pattern detection method 202 utilizes the learned pattern detection parameter 114 that includes learned information like the intensity and morphological characteristics of the cells of interest that should be detected. In this embodiment of the invention, the at least one learned pattern detection parameter 114 contains a plurality of parameters and is divided into a detection group and a partition group. One of the detection group parameters is an intensity threshold that separates the image data into foreground pixels and background pixels. A connected components module then processes all of the foreground pixels to group together regions of connected pixels. Another parameter in the detection group is a range of minimum and maximum volumes of objects. The connected foreground pixels are filtered by volume using the minimum and maximum volume limits to remove connected volumes that do not fall into the acceptable range. An example learned pattern detection parameter 114 in the partition group is the range of radii. The range of radii is used by the pattern detection 202 to control a partitioning method that separates a connected component containing a group of cells into multiple connected components, one for each cell. Another learned pattern detection parameter 114 in the partition group is minimum edge to center distance that specifies the minimum distance from the center of an object to the edge that is touching its closest neighboring object. A lower value will partition objects more aggressively resulting in smaller, more uniform objects, and vice versa.

The computerized automated parameterization image pattern detection method supports incremental update of the learned pattern detection parameter 114. For the update learning, additional learning image and additional labeled region data are entered into electronic storage means. An updated morphological metrics learning is performed using the at least one morphological metric and the additional labeled region data to generate the updated morphological metric. An updated intensity metrics learning is performed using the at least one intensity metric, the additional learning image and the additional labeled region data to generate the updated intensity metric. Finally, the updated population learning is performed by computing means using the learned pattern detection parameter 114. The updated morphological metrics and the updated intensity metrics are processed to generate the updated learned pattern detection parameter. In one embodiment of the invention, the raw statistics such as the sum of intensities, and the parameter distribution histograms are stored internally in the learned pattern detection parameter 114. The raw statistics can be incrementally updated with the additional data and then the updated parameters can be derived from the updated raw statistics.

II. Automated Pattern Detection with Pixel Classification

Figure 3:
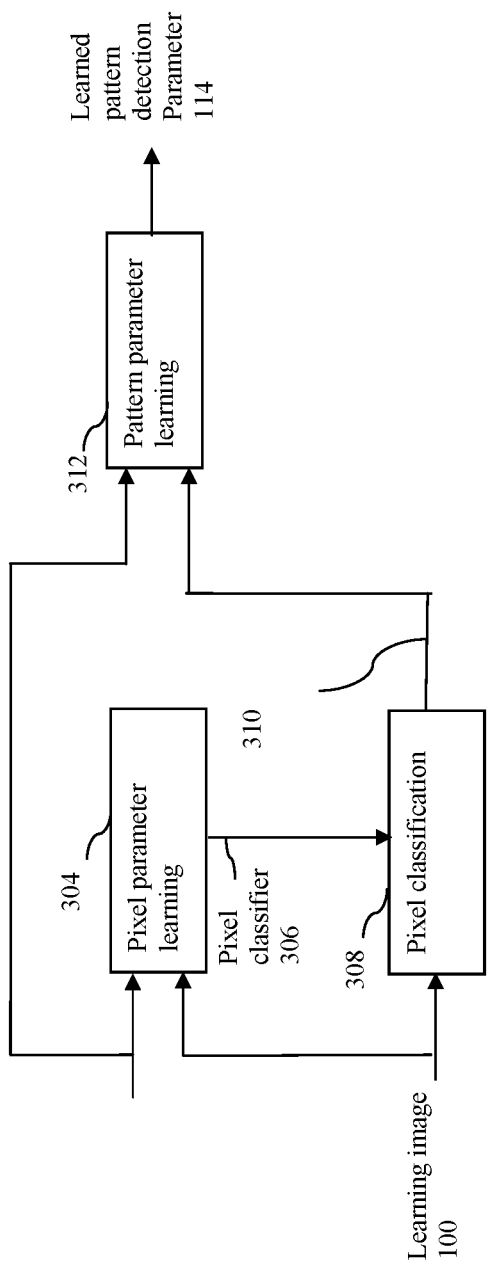
FIG. 3 shows the processing flow of the automated parameterization with pixel classification for image pattern detection.

FIG. 3 shows the processing flow of the current invention that performs automated parameterization image pattern detection with integrated pixel classification 308. That is, in addition to the learning of the learned pattern detection Parameter 114, the same learning image 100 and labeled region data 102 are used for the learning of pixel classifier 306.

The learning image 100 and the corresponding labeled region data 102 are first entered into electronic storage means such as computer memories. The learning images 100 and labeled region data 102 are input into the pixel parameter learning 304 to learn a pixel classifier 306. The learning image 100 is processed by pixel classification 308 using the pixel classifier 306 to produce pixel class confidence 310. The pattern parameter learning 312 then processes the labeled region data 102 and the pixel class confidence 310 to produce the learned pattern detection parameter 114. In one embodiment of the invention, the pattern parameter learning 312 is depicted in FIG. 1 except that the learning image 100 is replaced by the pixel class confidence 310 to be analyzed by the intensity metrics learning 106.

In one embodiment of the invention, the learning image 100 contains cellular structures imaged under a microscope that are coupled with manually labeled or fluorescently labeled region data 102 highlighting a variety of structures of interest and/or subcellular components.

The pixel parameter learning 304 learns pixel-wise features for each pixel of the learning image 100 having good discrimination power for labeled region data 102. In one embodiment of the invention, the features include image pixels processed by a variety of filters such as Gaussian, structure tensor, Hessian, etc. This is followed by a supervised learning classifier such as random forest, support vector machine or binary decision trees that learns its decision rules based upon the pixel-wise features that predict the confidence of a pixel being in a labeled region. After pixel parameter learning 304, a pixel classifier 306 is generated. Each pixel in the learning image 100 is then processed by the pixel classification 308 step using the pixel classifier 306 and the pixel class confidence 310 is generated. The pattern parameter learning 312 then learns intensity and morphological metric of the patterns defined in the labeled region data 102 using the pixel class confidence 310 and generates learned pattern detection parameter 114.

Figure 4:
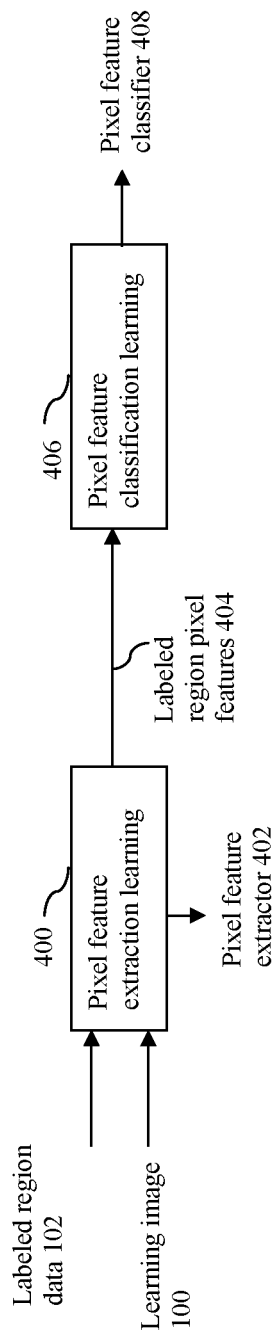
FIG. 4 shows the processing flow of the pixel parameter learning method.

FIG. 4 shows the processing flow of the pixel parameter learning method. The learning image 100 and corresponding labeled region data 102 are entered into electronic storage means such as computer memories. The pixel feature extraction learning 400 learns from the labeled region data 102 and the learning image 100 to generate a pixel feature extractor 402 and produce labeled region pixel features 404. The pixel feature extraction learning 400 selects from a set of features and/or feature combinations the ones having good discrimination for the labeled regions in the labeled region data 102. The pixel feature extractor 402 contains the information needed for a computing means to generate the selected features. The labeled region pixel features 404 are the selected feature values of the pixels within the labeled region generated from the learning image 100. The pixel feature classification learning 406 then learns decision rules using the labeled region pixel features 404 and creates a pixel feature classifier 408 that can maximize the discrimination among the labeled region classes using the labeled region pixel features 404. Those skilled in the art should recognize that a variety of supervised machine learning classifier such as random forest, support vector machine, deep learning models or binary decision trees can be used for pixel feature classification.

In one embodiment of the invention the pixel feature extraction learning 400 and pixel feature classification learning 406 are implemented together. The pixel features are implemented as a series of predefined methods and kernel sizes that extract a variety of pixel-wise characteristics at different scales. The discriminative features are learned by processing the pixels with a random forest classifier to learn the relative importance of each feature and scale. The features with the highest relative importance are saved and their specification becomes the learned pixel feature extractor 402. The learned random forest classifier will be the pixel feature classifier 408. In another embodiment of the invention, a pixel feature extraction learning 400 and pixel feature classification learning 406 are created concurrently by training variations of the UNet deep learning model for semantic segmentation. In yet a third embodiment of the invention the method described in the learnable regions segmentation (U.S. Pat. No. 7,203,360) is used for pixel parameter learning 304 and pixel classification 308.

Figure 5:
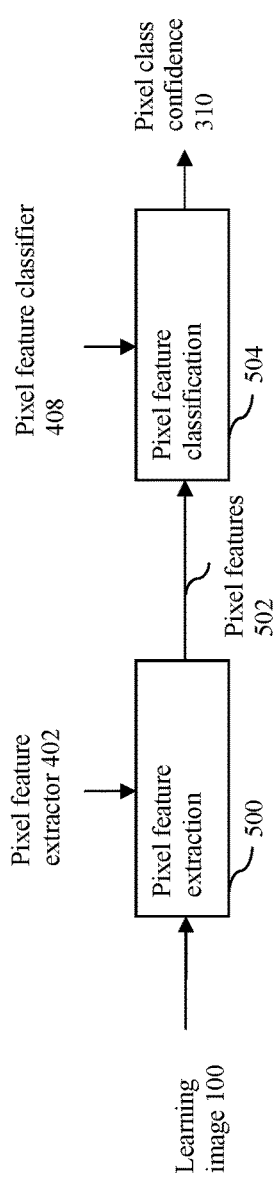
FIG. 5 shows the processing flow of the pixel classification method.

The pixel feature extractor 402 and pixel feature classifier 408 together form the pixel classifier 306. FIG. 5 shows the processing flow of the pixel classification 308 method. The learning image 100 is entered into electronic storage means such as computer memories. The pixel feature extractor 402 instructs the pixel feature extraction 500 step to extract pixel features 502 for the learning image 100. The pixel feature classification 504 then performs using the pixel feature classifier 408 to produce the pixel class confidence 310. The pixel class confidence 310 can be in the form a label indicating the predicted class or the confidence. It can also be in the form of a vector where each entry indicates how likely that pixel belongs to each class.

Figure 9:
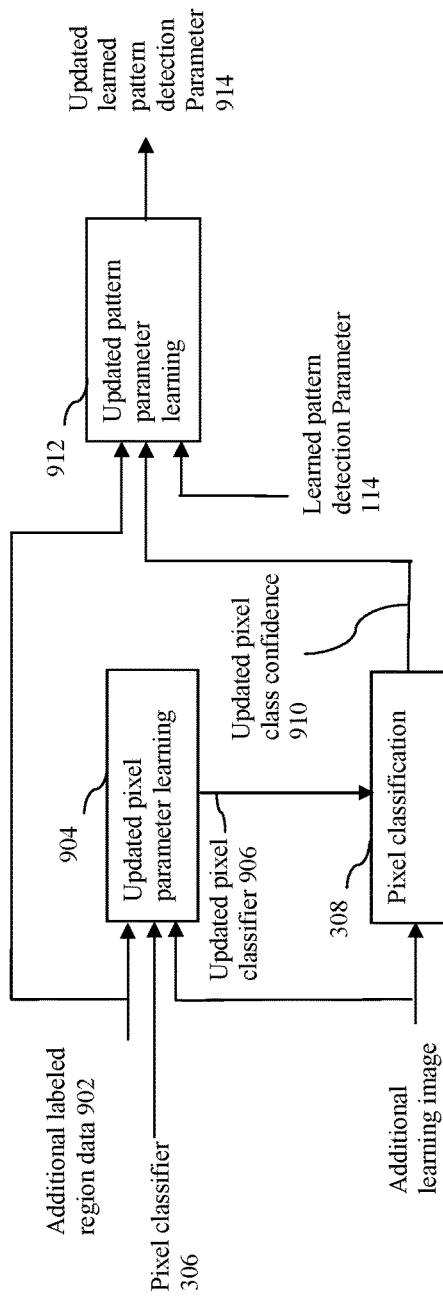
FIG. 9 shows the processing flow of the incremental update of the learned pattern detection parameter of the automated parameterization with pixel classification for image pattern detection.

The computerized automated parameterization image pattern detection with pixel classification method supports incremental update of the learned pattern detection parameter 114. As shown in FIG. 9, for the update learning, additional learning image 900 and additional labeled region data 902 are entered into electronic storage means. An updated pixel parameter learning 904 is performed by computing means using the pixel classifier 306, the additional labeled region data 902 and the additional learning image 900 to generate updated pixel classifier 906. The pixel classification is performed by computing means to the additional learning image 900 using the updated pixel classifier 906 to generate updated pixel class confidence 910. Finally, updated pattern parameter learning 912 is performed by computing means using the learned pattern detection parameter 114, the additional labeled region data 902 and the updated pixel class confidence 910 to generate at least one updated learned pattern detection parameter 914.

III. Automated Parameterization for Image Pattern Detection and Classification

Figure 6:
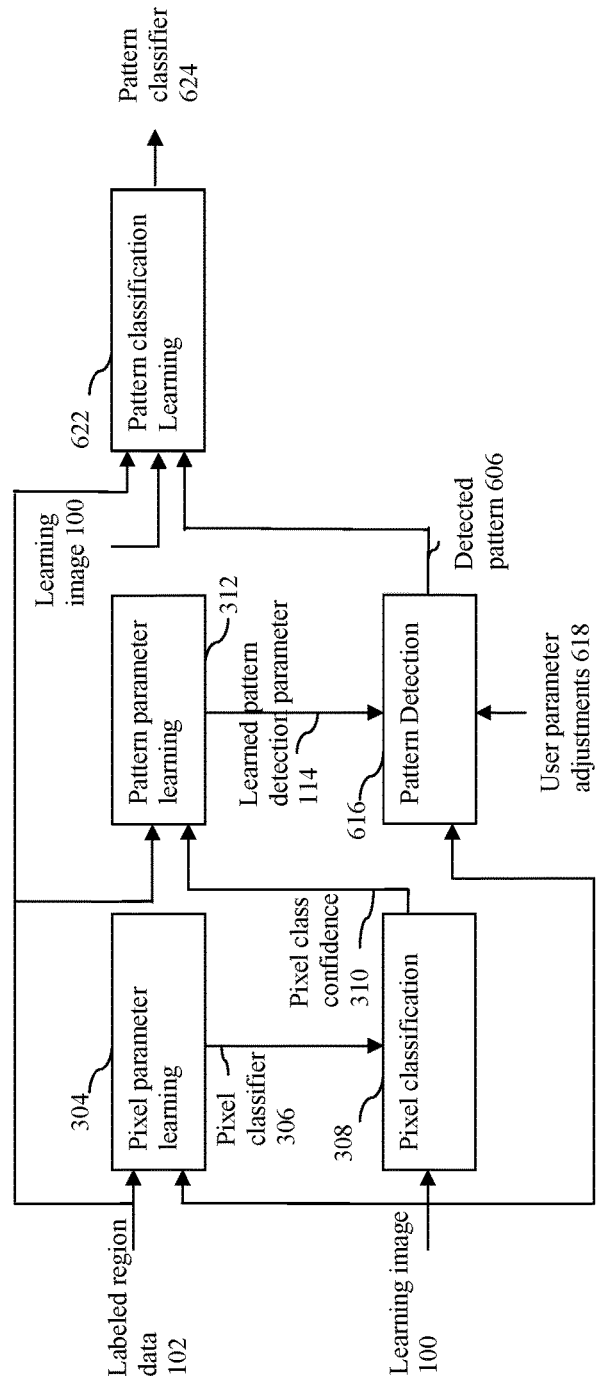
FIG. 6 shows the processing flow of the automated parameterization for image pattern detection and classification.

FIG. 6 shows the processing flow of the current invention that performs automated pattern parameter learning 312 with integrated pixel classification 308 and pattern classification. In this invention, in addition to the learning of the learned pattern detection Parameter 114, the same learning image 100 and labeled region data 102 are used for the learning of pixel classifier 306 as well as the pattern classifier 624.

The learning image 100 and the corresponding labeled region data 102 are first entered into electronic storage means such as computer memories. Similar to FIG. 3, the pixel parameter learning 304 learns a pixel classifier 306 from the labeled region data 102 and learning image 100. The pixel classification 308 then produces the pixel class confidence 310. The pattern parameter learning 312 processes the pixel class confidence 110 and the labeled region data 102 to generate learned pattern detection parameter 114. The pattern detection 616 step applies the learned pattern detection parameter 114 with optional user parameter adjustment 618 to the learning image 100 to generate detected pattern 606. Finally, the pattern classification learning 622 learns a pattern classifier 624 using the learning image 100, the labeled region data 102 and the detected pattern 606.

FIG. 7 shows the processing flow of the pattern classification learning 622 method. The labeled region data 102 and detected pattern 606 are processed by a pattern labeling 700 step that labels the truth classes for the detected patter 606. The class assignment for each detected pattern could be by the majority labels in the labeled region data 102 or by other mapping rules. The pattern feature extraction learning 702 processes the labeled pattern 701 and the learning image 100 to generate the pattern feature extractor 704 and the labeled pattern features 706. The pattern feature classification learning 708 processes the labeled pattern features 706 to learn the pattern feature classifier 710.

In one embodiment of the invention the pattern feature extraction learning 702 extracts a variety of intensity and morphological measurements from the learning image 100 within each of the labeled pattern 701. The discriminative features are learned by processing the patterns with a supervised machine learning classifier such as random forest to learn the importance of the features. The features with the highest importance are included in the specification of the pattern feature extractor 704 and the features associated with the learning images 100 are included in the labeled pattern features 706. The pattern feature classification learning 708 learns a supervised machine learning classifier such as random forest, support vector machine, binary decision trees, deep learning models using the labeled pattern features 706 to generate pattern feature classifier 710. The pattern feature extractor 704 and pattern feature classifier 710 together form the pattern classifier 624. In another embodiment of the invention, the teachable pattern scoring method (U.S. Pat. No. 9,152,884) is used for the pattern classification learning. In a third embodiment of the invention, the method described in the regulation of hierarchic decisions in intelligent systems (U.S. Pat. No. 7,031,948) is used for the pattern classification learning.

FIG. 8 shows the processing flow of the application method of the pattern classifier 624. The image data 200 and pattern regions 800 are entered into electronic storage means such as computer memories. The pattern feature extraction 802 uses the pattern feature extractor 704 to extract pattern features 804 for each of the regions in the pattern regions 800. The features are extracted from the image data 200. The pattern feature classification 806 uses the pattern feature classifier 710 to produce the classified patterns 808. In an alternative embodiment of the invention, the classified patterns include pattern class confidence which can be in the form a label where the label indicates the predicted pattern class or the confidence can be in the form of a vector where each entry indicates how likely that pattern belongs to a specific class.

Figure 10:
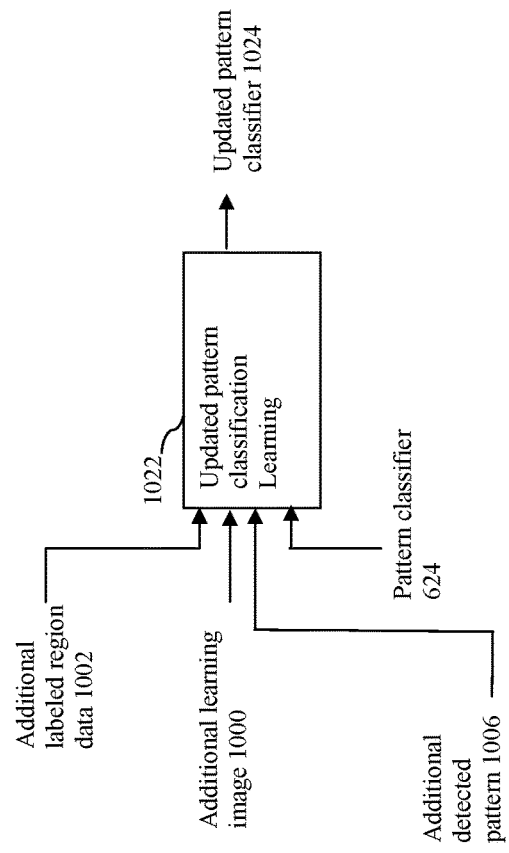
FIG. 10 shows the processing flow of the updated pattern classification learning of the image pattern detection and classification method.

In one embodiment of the invention, the pattern classifier 624 can be updated with new data. This is important because the pattern classifier 624 may need more training data to become a matured classifier. In many cases only pattern classifier 624 needs update and the training of the pixel classifier 306 and learned pattern detection parameter 114 may be sufficiently trained by the labeled region data 102 and learning image 100 without update. As shown in FIG. 10, to update train the pattern classifier 624, additional learning image 1000, additional labeled region data 1002 and additional detected pattern 1006 are inputted into electronic storage means. The additional detected pattern 1006 can be generated by applying additional learning image 1000 and additional labeled region 1002 with the pixel classifier 306 and learned pattern detection parameter 114. Afterwards, updated pattern classification learning 1022 can be performed by computing means using the pattern classifier 624, the additional labeled region data 1002, the additional learning image 1000 and the additional detected pattern 1006 to generate updated pattern classifier 1024. The process can continue until an updated pattern classifier 1024 is trained by a sufficient number of training data.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized automated parameterization image pattern detection method, comprising the steps of:
    a) inputting learning image and labeled region data into electronic storage means;
    b) performing a morphological metrics learning by computing means using the labeled region data to generate at least one morphological metric;
    c) performing an intensity metrics learning by computing means using the learning image and the labeled region data to generate at least one intensity metric; and
    d) performing a population learning by computing means using the at least one morphological metric and the at least one intensity metric to generate at least one learned pattern detection parameter.

2. The computerized automated parameterization image pattern detection method of claim 1, further comprising the steps of:
    a) inputting additional learning image and additional labeled region data into electronic storage means;
    b) performing an updated morphological metrics learning by computing means using the at least one morphological metric and the additional labeled region data to generate at least one updated morphological metric;
    c) performing an updated intensity metrics learning by computing means using the at least one intensity metric, the additional learning image and the additional labeled region data to generate at least one updated intensity metric; and
    d) performing an updated population learning by computing means using the at least one learned pattern detection parameter, the at least one updated morphological metric and the at least one updated intensity metric to generate at least one updated learned pattern detection parameter.

3. The computerized automated parameterization image pattern detection method of claim 1, further comprising the steps of:
    a) inputting image data into electronic storage means; and
    b) applying a pattern detection by computing means to the image data using the at least one learned pattern detection parameter to generate a detected pattern.

4. The computerized automated parameterization image pattern detection method of claim 3, wherein the pattern detection further comprises user parameter adjustment.

5. A computerized automated parameterization image pattern detection method, comprising the steps of:
    a) inputting learning image and labeled region data into electronic storage means;
    b) performing a pixel parameter learning by computing means using the labeled region data and the learning image to generate pixel classifier;
    c) applying a pixel classification by computing means to the learning image using the pixel classifier to generate a pixel class confidence; and
    d) performing a pattern parameter learning by computing means using the labeled region data and the pixel class confidence to generate at least one learned pattern detection parameter.

6. The computerized automated parameterization image pattern detection method of claim 5, wherein the pixel classifier consists of a pixel feature extractor and a pixel feature classifier, and wherein the pixel parameter learning comprises the steps of:
    a) performing a pixel feature extraction learning using the labeled region data and the learning image to generate the pixel feature extractor and labeled region pixel features; and
    b) performing a pixel feature classification learning using the labeled region pixel features to generate the pixel feature classifier.

7. The computerized automated parameterization image pattern detection method of claim 5, wherein the pixel classifier consists of a pixel feature extractor and a pixel feature classifier, and wherein the pixel classification comprises the steps of:
    a) performing a pixel feature extraction using the learning image and the pixel feature extractor to generate pixel features; and
    b) performing a pixel feature classification using the pixel features and the pixel feature classifier to generate the pixel class confidence.

8. The computerized automated parameterization image pattern detection method of claim 5, wherein the pattern parameter learning comprises the steps of:
    a) performing a morphological metrics learning by computing means using the labeled region data to generate at least one morphological metric;
    b) performing an intensity metrics learning by computing means using the learning image and the pixel class confidence to generate at least one intensity metric; and
    c) performing a population learning by computing means using the at least one morphological metric and the at least one intensity metric to generate the at least one learned pattern detection parameter.

9. The computerized automated parameterization image pattern detection method of claim 5, further comprising the steps of:
    a) inputting additional learning image and additional labeled region data into electronic storage means;
    b) performing an updated pixel parameter learning by computing means using the pixel classifier, the additional labeled region data and the additional learning image to generate updated pixel classifier;

c) applying pixel classification by computing means to the additional learning image using the updated pixel classifier to generate updated pixel class confidence; and d) performing an updated pattern parameter learning by computing means using the learned pattern detection parameter, the additional labeled region data and the updated pixel class confidence to generate at least one updated learned pattern detection parameter.

10. The computerized automated parameterization image pattern detection method of claim 5, further comprising the steps of:

a) inputting image data into electronic storage means; and b) applying pattern detection by computing means to the image data using the at least one learned pattern detection parameter to generate detected pattern.

11. The computerized automated parameterization image pattern detection method of claim 10, wherein the pattern detection further comprises user parameter adjustment.

12. A computerized automated parameterization image pattern detection and classification method, comprising the steps of:

a) inputting learning image and labeled region data into electronic storage means;

b) performing a pixel parameter learning by computing means using the labeled region data and the learning image to generate pixel classifier;

c) applying a pixel classification by computing means to the learning image using the pixel classifier to generate pixel class confidence;

d) performing a pattern parameter learning by computing means using the labeled region data and the pixel class confidence to generate at least one learned pattern detection parameter output;

e) applying a pattern detection by computing means to the learning image using the at least one learned pattern detection parameter to generate detected pattern; and f) performing a pattern classification learning by computing means using the labeled region data, the learning image and the detected pattern to generate pattern classifier.

13. The computerized automated parameterization image pattern detection and classification method of claim 12, wherein the pixel classifier consists of a pixel feature extractor and a pixel feature classifier, and wherein the pixel parameter learning comprises the steps of:

a) performing a pixel feature extraction learning using the labeled region data and the learning image to generate the pixel feature extractor and labeled region pixel features; and b) performing a pixel feature classification learning using the labeled region pixel features to generate the pixel feature classifier.

14. The computerized automated parameterization image pattern detection and classification method of claim 12, wherein the pixel classifier consists of a pixel feature extractor and a pixel feature classifier, and wherein the pixel classification comprises the steps of:

a) performing a pixel feature extraction using the learning image and the pixel feature extractor to generate pixel features; and b) performing a pixel feature classification using the pixel features and the pixel feature classifier to generate the a pixel class confidence.

15. The computerized automated parameterization image pattern detection and classification method of claim 12, wherein the pattern parameter learning comprises the steps of:

a) performing a morphological metrics learning by computing means using the labeled region data to generate at least one morphological metric;

b) performing an intensity metrics learning by computing means using the labeled region data and the pixel class confidence to generate at least one intensity metric; and c) performing a population learning by computing means using the at least one morphological metric and the at least one intensity metric to generate the at least one learned pattern detection parameter.

16. The computerized automated parameterization image pattern detection and classification method of claim 12, wherein the pattern detection further comprises user parameter adjustment.

17. The computerized automated parameterization image pattern detection and classification method of claim 12, wherein the pattern classifier consists of a pattern feature extractor and a pattern feature classifier, and wherein the pattern classification learning comprises the steps of:

a) performing a pattern labeling using the labeled region data and the detected pattern to generate a labeled pattern;

b) performing a pattern feature extraction learning using the labeled pattern and the learning image to generate the pattern feature extractor and labeled pattern features; and c) performing a pattern feature classification learning using the labeled pattern features to generate the pattern feature classifier.

18. The computerized automated parameterization image pattern detection and classification method of claim 12, wherein the pattern classifier consists of a pattern feature extractor and a pattern feature classifier, the method further comprising the steps of:

a) inputting image data and pattern regions into electronic storage means;

b) performing a pattern feature extraction using the image data, the pattern regions and the pattern feature extractor to generate pattern features; and c) performing a pattern feature classification using the pattern features and the pattern feature classifier to generate classified patterns.

19. The computerized automated parameterization image pattern detection and classification method of claim 12, further comprising the steps of:

a) inputting additional learning image, additional labeled region data and additional detected pattern into electronic storage means; and b) performing an updated pattern classification learning by computing means using the pattern classifier, the additional labeled region data, the additional learning image and the additional detected pattern to generate updated pattern classifier.

* * * * *